(12) United States Patent
Minami et al.

(10) Patent No.: US 6,414,090 B2
(45) Date of Patent: Jul. 2, 2002

(54) PROCESS FOR PRODUCING A POLYMER OF AN α-OLEFIN AND LUBRICANT

(75) Inventors: Yutaka Minami; Tatsuya Egawa, both of Chiba-ken (JP)

(73) Assignees: Idemitsu Petrochemical Co., Ltd.; Idemitsu Kosan Co., Ltd., both of Tokyo (JP)

( * ) Notice: Subject to any disclaimer, the term of this patent is extended or adjusted under 35 U.S.C. 154(b) by 0 days.

(21) Appl. No.: 09/860,912

(22) Filed: May 21, 2001

(30) Foreign Application Priority Data

May 30, 2000 (JP) .......................... 2000-160355

(51) Int. Cl.$^7$ .............................. C08F 8/04; C08F 4/642; C08F 10/08

(52) U.S. Cl. .................... 525/338; 525/333.7; 526/126; 526/127; 526/131; 526/132; 526/160; 526/170; 526/348.2; 526/348.3; 526/348.6; 526/905; 585/18; 585/511; 585/512; 585/513

(58) Field of Search ............................... 526/126, 127, 526/131, 132, 160, 348.6, 905, 348.2, 348.3, 170; 585/10, 18, 255, 511, 512, 513; 525/333.7, 338

(56) References Cited

U.S. PATENT DOCUMENTS

| 4,613,712 A | * | 9/1986 | Bridger ............... 526/348.3 X |
| 5,012,020 A | | 4/1991 | Jackson et al. |
| 5,187,250 A | * | 2/1993 | Asanuma et al. .... 526/348.3 X |
| 5,496,902 A | * | 3/1996 | Evertz et al. .............. 526/127 |
| 5,908,903 A | * | 6/1999 | Rosch ................ 526/348.3 X |
| 6,270,911 B1 | | 8/2001 | Seta et al. |

FOREIGN PATENT DOCUMENTS

EP    0 818 458    1/1998

OTHER PUBLICATIONS

U.S. application 09/463,989, filed Apr. 27, 2000, pending.
U.S. application 09/424,985, filed Dec. 3, 1999, pending.
U.S. application No. 6,270,911, filed Aug. 7, 2001, Seta et al.
U.S. application No. 09/529,418, May 1, 2000, allowed.
U.S. application No. 09/646,871, Oct. 4, 2000, pending.
U.S. application No. 09/719,552, Feb. 28, 2001, pending.
U.S. application 09/784,444, Feb. 26, 2001, pending.
U.S. application 09/860,912, May 21, 2001, pending.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for producing a polymer of an α-olefin. The process includes polymerizing one or more α-olefins having at least 4 carbon atoms in the presence of a catalyst for producing polymers of olefins. The catalyst contains (A) a specific metal compound and (B) either or both of (b-1) an organoaluminum oxy compound and (b-2) an ionic compound. The polymer of an α-olefin is useful as a lubricant component.

9 Claims, No Drawings

PROCESS FOR PRODUCING A POLYMER OF AN α-OLEFIN AND LUBRICANT

BACKGROUND OF THE INVENTION

1. Field of the Invention

The present invention relates to a novel process for producing a polymer of an α-olefin comprising polymerizing an α-olefin having at least 4 carbon atoms and a lubricant comprising the polymer.

2. Description of the Related Arts

Various attempts have been made to obtain poly-α-olefins which are useful as synthetic hydrocarbon lubricant. For example, a process for polymerizing 1-decene in the presence of a Friedel-Crafts catalyst which is aluminum chloride or boron trifluoride is disclosed (U.S. Pat. Nos. 3,149,178 and 3,382,291).

However, the obtained poly-α-olefin has a low molecular weight and the obtained lubricant had a low viscosity. Moreover, boron trifluoride is not only expensive but also causes an environmental problem since fluorine corroding apparatuses is formed.

It has been disclosed that ethylene or an α-olefin is polymerized in accordance with various processes and the obtained polymer is used as a synthetic hydrocarbon lubricant. Examples of such processes include a process in which a reduced chromium catalyst is used (Japanese Patent Application (as a national phase under PCT) Laid-Open No. Heisei 9(1997)-508151), a process in which cation polymerization is conducted (Japanese Patent Application (as a national phase under PCT) Laid-Open No. Heisei 8(1996)-505888), a process in which a Ziegler-type catalyst is used (Japanese Patent Application Laid-Open No. Heisei 7(1995)-145205 and Heisei 5(1993)-271339) and processes in which a metallocene catalyst is used (Japanese Patent Application Laid-Open Nos. Heisei 7(1995)-133234 and Heisei 6(1994)-80725 and Japanese Patent Nos. 2796376 and 2664498). These processes have drawbacks in that an expensive catalyst is used, that the activity of the polymerization is small and that the use of ethylene is indispensable. Moreover, products obtained in accordance with these processes have a drawback in that the obtained polymer always has a low molecular weight or the polymer having an extremely high molecular weight is formed.

SUMMARY OF THE INVENTION

The present invention has an object of providing a novel process for producing a polymer of an α-olefin comprising polymerizing an α-olefin having at least 4 carbon atoms efficiently and a lubricant comprising the polymer.

As the result of extensive studies by the present inventors to achieve the above object, it was found that the above object can be achieved by a process for producing a polymer of an α-olefin which comprises polymerizing an α-olefin having at least 4 carbon atoms in the presence of a catalyst for producing polymers of olefins which comprises (A) a specific transition metal catalyst and (B) at least one compound selected from (b-1) organoaluminum oxy compounds and (b-2) ionic compounds which can be converted into cations by reaction with the transition metal compounds of component (A). The present invention has been completed based on the knowledge.

The present invention provides:

(1) A process for producing a polymer of an α-olefin which comprises polymerizing an α-olefin having at least 4 carbon atoms in a presence of a catalyst for producing polymers of olefins which comprises:

(A) at least one compound selected from transition metal compounds represented by following general formulae (I) and (II):

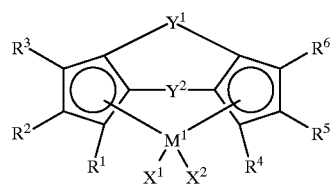

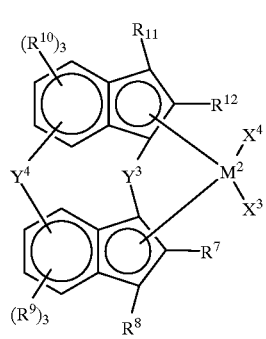

wherein $R^1$ to $R^{12}$ and $X^1$ to $X^4$ each independently represent hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^1$ to $R^{12}$ and $X^1$ to $X^4$ may form a ring by forming bonds between each other; three groups represented by $R^9$ may be the same with or different from each other; three groups represented by $R^{10}$ may be the same with or different from each other; $Y^1$ to $Y^4$ each independently represent a divalent group which forms a bond between two ligands and is selected from hydrocarbon groups having 1 to 20 carbon atoms, hydrocarbon groups having 1 to 20 carbon atom and a halogen atom, a group having silicon, a group having germanium, a group having tin, —O—, —CO—, —S—, —SO$_2$—, —NR$^{13}$—, —PR$^{13}$—, —P(O)R$^{13}$—, —BR$^{13}$— and —AlR$^{13}$—, $R^{13}$ representing hydrogen atom, a halogen atom, a hydrocarbon group having 1 to 20 carbon atoms or a hydrocarbon group having 1 to 20 carbon atoms and a halogen atom, and $M^1$ and $M^2$ each independently represent a transition metal of Groups 4 to 6 of the Periodic Table; and (B) at least one compound selected from (b-1) organoaluminum oxy compounds and (b-2) ionic compounds which can be converted into cations by reaction with the transition metal compounds of component (A);

(2) A process described in (1), wherein the groups represented by $Y^1$ and $Y^2$ in general formula (I) representing the transition metal compound are each bonded to ligands in a meso form;

(3) A process described in any of (1) and (2), which comprises polymerizing an α-olefin having at least 4 carbon atoms in a presence of hydrogen;

(4) A polymer of an α-olefin which is obtained in accordance with a process described in any of (1) to (3) and has a weight-average molecular weight in a range of 300 to 1,000,000;

(5) A polymer of an α-olefin which is obtained by hydrogenating a polymer of an α-olefin described in any of (4); and (6) A lubricant which comprises a polymer of an α-olefin described in any of (4) and (5).

DESCRIPTION OF THE PREFERRED EMBODIMENTS

The present invention relates to the process for producing a polymer of an α-olefin and the lubricant which are described above.

The present invention will be described in detail in the following.

1. The Process for Producing a Polymer of an α-olefin

In accordance with the process of the present invention, an α-olefin having at least 4 carbon atoms is polymerized in the presence of a catalyst for producing polymers of olefins which comprises:

(A) at least one compound selected from transition metal compounds represented by following general formulae (I) and (II):

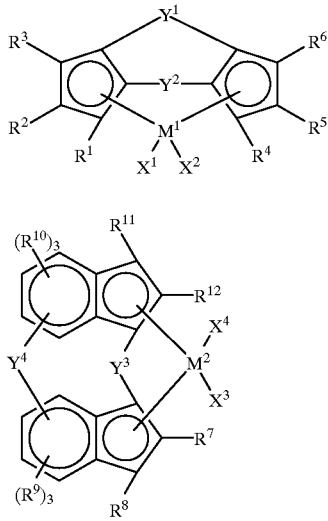

wherein $R^1$ to $R^{12}$ and $X^1$ to $X^4$ each independently represent hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^1$ to $R^{12}$ and $X^1$ to $X^4$ may form a ring by forming bonds between each other; three groups represented by $R^9$ may be the same with or different from each other; three groups represented by $R^{10}$ may be the same with or different from each other; $Y^1$ to $Y^4$ each independently represent a divalent group which forms a bond between two ligands and is selected from hydrocarbon groups having 1 to 20 carbon atoms, hydrocarbon groups having 1 to 20 carbon atom and a halogen atom, a group having silicon, a group having germanium, a group having tin, —O—, —CO—, —S—, —SO$_2$—, —NR$^{13}$—, —PR$^{13}$—, —P(O)R$^{13}$—, —BR$^{13}$— and —AlR$^{13}$—, $R^{13}$ representing hydrogen atom, a halogen atom, a hydrocarbon group having 1 to 20 carbon atoms or a hydrocarbon group having 1 to 20 carbon atoms and a halogen atom, and $M^1$ and $M^2$ each independently represent a transition metal of Groups 4 to 6 of the Periodic Table; and (B) at least one compound selected from (b-1) organoaluminum oxy compounds and (b-2) ionic compounds which can be converted into cations by reaction with the transition metal compounds of component (A); and in the presence of hydrogen, where necessary.

The compound represented by general formula (I) described above may be a transition metal compound in which the groups represented by $Y^1$ and $Y^2$ are each bonded to ligands in the meso form or in the racemic form. It is preferable that the groups represented by $Y^1$ and $Y^2$ are bonded to ligands in the meso form.

Preferable examples of the compound represented by general formula (I) described above include transition metal compounds of Groups 4 to 6 of the Periodic Table which are represented by the following general formulae (I)A and (I)B:

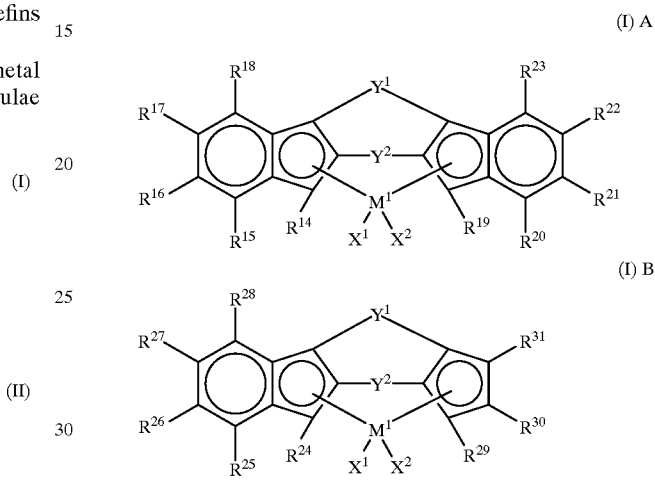

wherein $R^{14}$ to $R^{31}$, $X^1$ and $X^2$ each independently represent hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^{14}$ to $R^{31}$, $X^1$ and $X^2$ may form a ring by forming bonds between each other; $Y^1$ and $Y^2$ each independently represent a divalent group which forms a bond between two ligands and is selected from hydrocarbon groups having 1 to 20 carbon atoms, hydrocarbon groups having 1 to 20 carbon atom and a halogen atom, a group having silicon, a group having germanium, a group having tin, —O—, —CO—, —S—, —SO$_2$—, —NR$^{32}$—, —PR$^{32}$—, —P(O)R$^{32}$—, —BR$^{32}$— and —AlR$^{32}$—, $R^{32}$ representing hydrogen atom, a halogen atom, a hydrocarbon group having 1 to 20 carbon atoms or a hydrocarbon group having 1 to 20 carbon atoms and a halogen atom, and $M^1$ represents a transition metal of Groups 4 to 6 of the Periodic Table.

Specific examples of the compound represented by general formula (I)A include dichloro compounds such as (1,1'-ethylene) (2,2'-ethylene) Bisindenyl zirconium dichloride, (1,1'-ethylene) (2,2'-ethylene)bis(3-methylindenyl)zirconium dichloride, (1,1'-ethylene) (2,2'-ethylene)bis(4-methylindenyl)zirconium dichloride, (1,1'-ethylene) (2,2'-ethylene)bis(5-methylindenyl)zirconium dichloride, (1,1'-ethylene) (2,2'-ethylene)bis(5,6-benzoindenyl)zirconium dichloride, (1,1'-ethylene) (2,2'-ethylene)bis(4,5-benzoindenyl)zirconium dichloride, (1,1'-ethylene) (2,2'-ethylene)bis(5,6-dimethylindenyl)zirconium dichloride, (1,1'-dimethylsilylene) (2,2'-dimethylsilylene) bis indenyl zirconium dichloride, (1,1'-dimethylsilylene) (2,2'-dimethylsilylene)bis(3-methylindenyl)zirconium dichloride, (1,1'-dimethylsilylene) (2,2'-dimethylsilylene) bis(4-methylindenyl)zirconium dichloride, (1,1'-dimethylsilylene) (2,2'-dimethylsilylene)bis(5-methylindenyl)zirconium dichloride, (1,1'-dimethylsilylene) (2,2'-dimethyl-silylene)bis(5,6-benzoindenyl)zirconium dichloride, (1,1'-dimethylsilylene) (2,2'-dimethylsilylene) bis(4,5-benzoindenyl)zirconium dichloride, (1,1'-dimethylsilylene) (2,2'-dimethylsilylene)bis(5,6-dimethylindenyl)zirconium dichloride, (1,1'-dimethylsilylene) (2,2'-ethylene)bis indenyl zirconium dichloride, (1,1'-dimethylsilylene) (2,2'-ethylene)bis(3-methylindenyl)zirconium dichloride, (1,1'-dimethylsilylene) (2,2'-ethylene)bis(4-methylindenyl)zirconium dichloride, (1,1'-dimethylsilylene) (2,2'-ethylene)bis(5-methylindenyl)zirconium dichloride, (1,1'-dimethylsilyene) (2,2'-ethylene) bis(5,6-benzoindenyl)zirconium dichloride, (1,1'-dimethylsilylene) (2,2'-ethylene)bis(4,5-benzoindenyl)zirconium dichloride, (1,1'-dimethylsilylene) (2,2'-ethylene)bis(5,6-dimethylindenyl)zirconium dichloride, (1,1'-ethylene) (2,2'-dimethylsilylene)bisindenyl zirconium dichloride, (1,1'-ethylene) (2,2'-dimethylsilylene)bis(3-methylindenyl)zirconium dichloride, (1,1'-ethylene) (2,2'-dimethylsilylene)bis(4-methylindenyl)zirconium dichloride, (1,1'-ethylene) (2,2'-dimethyl-silylene)bis(5-methylindenyl)zirconium dichloride, (1,1'-ethylene) (2,2'-dimethylsilylene) bis(5,6-benzoindenyl)zirconium dichloride, (1,1'-ethylene) (2,2'-dimethylsilylene)bis(4,5-benzoindenyl)zirconium dichloride, (1,1'-ethylene) (2,2'-dimethylsilylene)bis(5,6-dimethylindenyl)zirconium dichloride, (1,1'-dimethylsilylene) (2,2'-isopropylidene)bis indenyl zirconium dichloride, (1,1'-dimethylsilylene) (2,2'-isopropylidene)bis(3-methyl-indenyl)zirconium dichloride, (1,1'-dimethylsilylene) (2,2'-isopropylidene)bis(4-methylindenyl)zirconium dichloride, (1,1'-dimethylsilylene) (2,2'-isopropylidene)bis(5-methylindenyl)zirconium dichloride, (1,1'-dimethylsilylene) (2,2'-isopropylidene)bis (5,6-benzoindenyl)zirconium dichloride, (1,1'-dimethylsilylene) (2,2'-isopropylidene)bis(4,5-benzoindenyl)zirconium dichloride, (1,1'-dimethylsilylene) (2,2'-isopropylidene)bis(5,6-dimethylindenyl)zirconium dichloride; dimethyl compounds, diethyl compounds, dihydro compounds, diphenyl compounds and dibenzyl compounds corresponding to the above dichloro compounds; titanium complex compounds corresponding to the above compounds; and hafnium complex compounds corresponding to the above compounds.

Specific examples of the compound represented by general formula (I)B include dichloro compounds such as (1,1'-ethylene) (2,2'-ethylene) indenyl (3,5-dimethylcyclopentadienyl)zirconium dichloride, (1,1'-ethylene) (2,2'-ethylene)indenyl(3,4-dimethylcyclopentadienyl)zirconium dichloride, (1,1'-ethylene) (2,2'-ethylene)indenyl (3-methylcyclopentadienyl)zirconium dichloride, (1,1'-ethylene) (2,2'-ethylene) (4-methylindenyl) (3,5-dimethylcyclopentadienyl)zirconium dichloride, (1,1'-ethylene) (2,2'-ethylene) (4-methylindenyl) (3-methylcyclopentadienyl)zirconium dichloride, (1,1'-ethylene) (2,2'-ethylene) (5-methylindenyl) (3,5-dimethylcyclopentadienyl)zirconium dichloride, (1,1'-ethylene) (2,2'-ethylene) (5-methylindenyl) (3-methylcyclopentadienyl)zirconium dichloride, (1,1'-dimethylsilylene) (2,2'-isopropylidene)indenyl(3,5-dimethylcyclopentadienyl)zirconium dichloride, (1'-dimethylsilylene) (2,2'-isopropylidene)indenyl (3,4-dimethylcyclopentadienyl)zirconium dichloride, (1,1'-dimethylsilylene) (2,2'-isopropylidene)indenyl (3-methyl-cyclopentadienyl)zirconium dichloride, (1,1'-dimethylsilylene) (2,2'-isopropylidene) (4-methylindenyl) (3,5-dimethylcyclopentadienyl)zirconium dichloride, (1,1'-dimethylsilylene) (2,2'-isopropylidene)(4-methylindenyl) (3-methylcyclopentadienyl)zirconium dichloride, (1,1'-dimethylsilylene) (2,2'-isopropylidene) (5-methylindenyl) (3,5-dimethylcyclopentadienyl)zirconium dichloride and (1,1'-dimethylsilylene) (2,2'-isopropylidene) (5-methylindenyl) (3-methylcyclopentadienyl)zirconium dichloride; and dimethyl compounds, diethyl compounds, dihydro compounds, diphenyl compounds and dibenzyl compounds corresponding to the above compounds of transition metals of Group 4 of the Periodic Table.

Preferable examples of the compound represented by general formula (II) described above include transition metal compounds of Groups 4 to 6 of the Periodic Table represented by the following general formulae (II)A and (II)B:

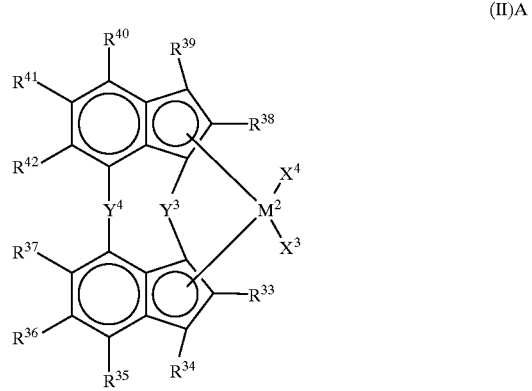

(II)A

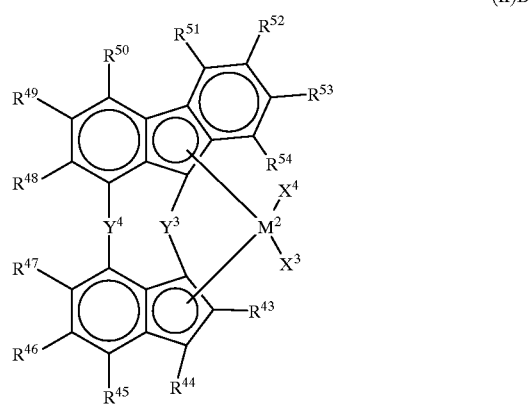

(II)B wherein $R^{33}$ to $R^{54}$, $X^3$ and $X^4$ each independently represent hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^{33}$ to $R^{54}$, $X^3$ and $X^4$ may form a ring by forming bonds between each other; $Y^3$ and $Y^4$ each independently represent a divalent group which forms a bond between two ligands and is selected from hydrocarbon groups having 1 to 20 carbon atoms, hydrocarbon groups having 1 to 20 carbon atom and a halogen atom, a group having silicon, a group having germanium, a group having tin, —O—, —CO—, —S—, —SO$_2$—, —NR$^{55}$—, —PR$^{55}$—, —P(O)R$^{55}$—, —BR$^{55}$— and —AlR$^{55}$—, R$^{55}$ representing hydrogen atom, a halogen atom, a hydrocarbon group having 1 to 20 carbon atoms or a hydrocarbon group having 1 to 20 carbon atoms and a halogen atom, and M² represents a transition metal of Groups 4 to 6 of the Periodic Table.

Specific examples of the compound represented by general formula (II)A include dichloro compounds such as (1,1'-ethylene) (7,7'-ethylene)bisindenylzirconium dicloride, (1,1'-ethylene) (7,7'-ethylene)bis(2-methylindenyl)zirconium dichloride, (1,1'-ethylene) (7,7'-ethylene)bis(3-methylindenyl)zirconium dichloride, (1,1'-dimethylsilylene) (7,7'-dimethylsilylene) bisindenylzirconium dichloride, (1,1'-dimethylsilylene) (7,7'-dimethylsilylene)bis(2-methylindenyl)zirconium dichloride, (1,1,-dimethylsilylene) (7,7'-dimethylsilylene) bis(3-methylindenyl)zirconium dichloride, (1,1'-ethylene) (7,7'-dimethylsilylene)bisindenylzirconium dichloride, (1,1'-ethylene) (7,7'-dimethylsilylene)bis(2-methylindenyl)-zirconium dichloride, (1,1'-ethylene) (7,7'-dimethylsilylene) bis(3-methylindenyl)zirconium dichloride, (1,1'-dimethylsilylene) (7,7'-ethylene)bisindenylzirconium dichloride, (1,1'-dimethylsilylene) (7,7'-ethylene)bis(2-methylindenyl) zirconium dichloride and (1,1'-dimethylsilylene) (7,7'-ethylene)bis( 3-methylindenyl)zirconium dichloride; and dimethyl compounds, diethyl compounds, dihydro compounds, diphenyl compounds and dibenzyl compounds corresponding to the above compounds of transition metals of Group 4 of the Periodic Table.

Specific examples of the compound represented by general formula (II)B include dichloro compounds such as (1,1'-ethylene) (2,7'-ethylene) (fluorenyl) (indenyl) zirconium dichloride, (1,1'-ethylene) (2,7'-ethylene) (fluorenyl) (2-methylindenyl)zirconium dichloride, (1,1'-ethylene)-(2,7'-ethylene) (fluorenyl) (3-methylindenyl) zirconium dichloride, (1,1'-ethylene) (2,7'-ethylene) (fluorenyl) (6-methylindenyl)zirconium dichloride, (1,1'-ethylene) (2,7'-ethylene) (9-methylfluorenyl) (indenyl) zirconium dichloride, (1,1'-ethylene) (2,7'-ethylene) (8-methylfluorenyl) (indenyl)zirconium dichloride, (1,1'-dimethylsilylene) (2,7'-ethylene) (fluorenyl) (indenyl) zirconium dichloride, (1,1'-dimethylsilylene) (2,7'-ethylene) (fluorenyl) (2-methylindenyl)zirconium dichloride, (1,1'-dimethyl-silylene) (2,7'-ethylene) (fluorenyl) (3-methylindenyl)zirconium dichloride, (1,1'-dimethylsilylene) (2,7'-ethylene) (fluorenyl) (6-methylindenyl)zirconium dichloride, (1,1'-dimethylsilylene) (2,7'-ethylene) (9-methyl-fluorenyl) (indenyl)zirconium dichloride, (1,1'-dimethylsilylene) (2,7'-ethylene) (8-methylfluorenyl) (indenyl)zirconium dichloride, (1,1'-ethylene) (2,7'-dimethylsilylene) (fluorenyl) (indenyl)zirconium dichloride, (1,1'-ethylene) (2,7'-dimethylsilylene) (fluorenyl) (2-methylindenyl) zirconium dichloride, (1,1'-ethylene) (2,7'-dimethylsilylene) (fluorenyl) (3-methyl-indenyl)zirconium dichloride, (1,1'-ethylene) (2,7'-dimethylsilylene) (fluorenyl) (6-methylindenyl)zirconium dichloride, (1,1'-ethylene) (2,7'-dimethylsilylene) (9-methylfluorenyl) (indenyl) zirconium dichloride, (1,1'-ethylene) (2,7-dimethylsilylene) (8-methylfluorenyl) (indenyl)zirconium dichloride, (1,1'-dimethylsilylene) (2,7'-dimethylsilylene) (fluorenyl) (indenyl)zirconium dichloride, (1,1'-dimethylsilylene) (2,7'-dimethylsilylene) (fluorenyl) (2-methylindenyl)zirconium dichloride, (1,1'-dimethylsilylene) (2,7'-dimethylsilylene) (fluorenyl) (3-methylindenyl)zirconium dichloride, (1,1'-dimethylsilylene) (2,7'-dimethylsilylene) (fluorenyl) (6-methylindenyl)zirconium dichloride, (1,1'-dimethylsilylene) (2,7'-dimethylsilylene) (9-methylfluorenyl) (indenyl)zirconium dichloride and (1,1'-dimethylsilylene) (2,7'-dimethylsilylene) (8-methylfluorenyl) (indenyl)zirconium dichloride; and dimethyl compounds, diethyl compounds, dihydro compounds, diphenyl compounds and dibenzyl compounds corresponding to the above compounds of transition metals of Group 4 of the Periodic Table.

The transition metal compounds used as component (A) may be used singly or in combination of two or more.

Examples of the organoaluminum oxy compound of component (b-1) of component (B) include chain aluminoxanes represented by the following general formula (III):

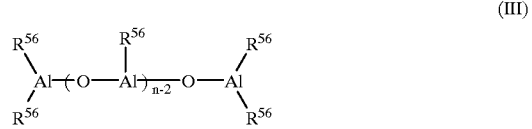

(III)

wherein $R^{56}$ represents a hydrocarbon group such as an alkyl group having 1 to 20 carbon atoms and preferably having 1 to 12 carbon atoms, an alkenyl group, an aryl group and an arylalkyl group or a halogen atom; n represents the degree of polymerization which is an integer, in general, in the range of 2 to 50 and preferably in the range of 2 to 40; and the groups and the atoms represented by a plurality of $R^{56}$ may the same with or different from each other; and cyclic aluminoxanes represented by the following general formula (IV):

(IV)

wherein $R^{56}$ and n are as defined above. Specific examples of the above compounds include methylaluminoxane, ethylaluminoxane and isobutylaluminoxane.

As the process for producing the above aluminoxane, a process in which an alkylaluminum is brought into contact with a condensation agent such as water can be conducted. However, the process is not particularly limited and any conventional process can be conducted. Examples of the process include (i) a process in which an organoaluminum compound is dissolved in an organic solvent and the solution is brought into contact with water, (ii) a process in which an organoaluminum compound is added into the mixture for polymerization in advance and water is added to the mixture thereafter, (iii) a process in which crystal water contained in a salt of a metal or water adsorbed to an inorganic substance or an organic substance is brought into reaction with an organoaluminum compound and (iv) a process in which a tetraalkyldialuminoxane is reacted with a trialkylaluminum and the product is further reacted with water. An aluminoxane insoluble in toluene may be used. The aluminoxane may be used singly or in combination of two or more.

As component (b-2), any ionic compound can be used as long as the ionic compound can be converted into a cation by reaction with the transition metal compound of component (A). Preferable examples of the above compound include compounds represented by the following general formulae (V) and (VI):

  (V)

  (VI)

In general formulae (V) and (VI), $L^2$ represents $M^5$, $R^{58}R^{59}M^6$, $R^{60}{}_3C$ or $R^{61}M^6$, $L^1$ represents a Lewis base and

[Z]⁻ represents an anion which does not coordinate and includes anions represented by [Z¹]⁻ and [Z²]⁻. [Z¹]⁻ represents an anion in which a plurality of groups are bonded to an element. [Z¹]⁻ is also expressed as [M⁷G¹G²···G^f]⁻, wherein M⁷ represents an element of Groups 5 to 15 of the Periodic Table and preferably an element of Groups 13 to 15 of the Periodic Table, G¹ to G^f each represent hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a hydrocarbon group having 1 to 20 carbon atoms and substituted with a halogen atom, an acyloxy group having 1 to 20 carbon atoms, an organometalloid group or a hydrocarbon group having 2 to 20 carbon atoms and a hetero atom. Two or more groups among the groups represented by G¹ to G^f may form a ring. f represents an integer of [the valency of the central metal atom M⁷]+1. [Z²]⁻ represents an anion which is a Brønsted acid alone, a conjugate base as a combination of the Brønsted acid and a Lewis acid or a conjugate base of an acid defined, in general, as a superstrong acid and has a logarithm of the inverse of the acid dissociation constant (pKa) of −10 or smaller. A Lewis base may be coordinated. R⁵⁷ represents hydrogen atom, an alkyl group having 1 to 20 carbon atoms, an aryl group having 6 to 20 carbon atoms, an alkylaryl group or an arylalkyl group. R⁵⁸ and R⁵⁹ each represent cyclopentadienyl group, a substituted cyclopentadienyl group, indenyl group or fluorenyl group. R⁶⁰ represents an alkyl group having 1 to 20 carbon atoms, an aryl group, an alkylaryl group or an arylalkyl group. R⁶¹ represents a ligand having a large ring such as tetraphenylporphyrin and phthalocyanine. k represents an integer of 1 to 3 which is the ionic charge number of [L¹—R⁵⁷] or [L²], a represents an integer of 1 or greater and b=(k×a). M⁵ represents an element including an element of Groups 1 to 3, 11 to 13 and 17 of the Periodic Table and MG represents an element of Groups 7 to 12 of the Periodic Table.

Examples of the Lewis base group represented by L¹ include ammonia; amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Examples of the atom and the groups represented by R⁵⁷ include hydrogen atom, methyl group, ethyl group, benzyl group and trityl group. Examples of the groups represented by R⁵⁸ and R⁵⁹ include cyclopentadienyl group, methylcyclopentadienyl group, ethyl-cyclopentadienyl group and pentamethylcyclopentadienyl group. Examples of the group represented by R⁶⁰ include phenyl group, p-tolyl group and p-methoxyphenyl group. Examples of the ligand represented by R⁶¹ include tetraphenylporphyrin, phthalocyanine, allyl group and methallyl group. Examples of the element represented by M⁵ include Li, Na, K, Ag, Cu, Br, I and I₃. Examples of the element represented by M⁶ include Mn, Fe, Co, Ni and Zn.

In the anion represented by [Z¹]⁻, which is also expressed as [M⁷G¹G²···G^f]⁻, examples of the element represented by M⁷ include B, Al, Si, P, As and Sb. Among these elements, B and Al are preferable. Examples of the atoms and groups represented by G¹ to G^f include dialkylamino groups such as dimethylamino group and diethylamino group; alkoxy groups and aryloxy groups such as methoxy group, ethoxy group, n-propoxy group and phenoxy group; hydrocarbon groups such as methyl group, ethyl group, n-propyl group, isopropyl group, n-butyl group, isobutyl group, n-octyl group, n-eicosyl group, phenyl group, p-tolyl group, benzyl group, 4-t-butylphenyl group and 3,5-dimethylphenyl group; halogen atoms such as fluorine atom, chlorine atom, bromine atom and iodine atom; hydrocarbon groups having a heteroatom such as p-fluorophenyl group, 3,5-difluorophenyl group, pentachlorophenyl group, 3,4,5-trifluorophenyl group, pentafluorophenyl group, 3,5-bis(trifluoromethyl)phenyl group and bis(trimethylsilyl)methyl group; and organometalloid groups such as pentamethylantimony group, trimethylsilyl group, trimethylgermyl group, diphenylarsine group, dicyclohexylantimony group and diphenylboron group.

Examples of the anion which is represented by [Z²]⁻, does not coordinate and has a logarithm of the inverse of the acid dissociation constant (pKa) of −10 or smaller, i.e., the Brønsted acid alone or the conjugate base as a combination of the Brønsted acid and a Lewis acid, include trifluoromethanesulfonate anion (CF₃SO₃)⁻, bis(trifluoromethanesulfonyl)methyl anion, bis(trifluoromethanesulfonyl)benzyl anion, bis(trifluoromethanesulfonyl)amide, perchlorate anion (ClO₄)⁻, trifluoroacetate anion (CF₃COO)⁻, hexafluoroantimony anion (SbF₆)⁻, fluorosulfonate anion (FSO₃)⁻, chlorosulfonate anion (ClSO₃)⁻, fluorosulfate anion/antimony pentafluoride (FSO₃/SbF₅)⁻, fluorosulfonate anion/arsenic pentafluoride (FSO₃/AsF₅)⁻ and trifluoromethanesulfonate anion/antimony pentafluoride (CF₃SO₃/SbF₅)⁻.

Examples of the compound of component (b-2) include triethylammonium tetraphenyl borate, tri-n-butylammonium tetraphenyl borate, trimethylammonium tetraphenyl borate, teraethylammonium tetraphenyl borate, methyl(tri-n-butyl)ammonium tetraphenyl borate, benzyl(tri-n-butyl)ammonium tetraphenyl borate, dimethyldiphenylammonium tetraphenyl borate, triphenyl(methyl)ammonium tetraphenyl borate, trimethylanilinium tetraphenyl borate, methylpyridinium tetraphenyl borate, benzylpyridinium tetraphenyl borate, methyl(2-cyanopyridinium)tetraphenyl borate, triethylammonium tetrakis(pentafluorophenyl)borate, tri-n-butylammonium tetrakis(pentafluorophenyl)borate, tripentylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentatluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenyl borate, silver tetraphenyl borate, trityl tetraphenyl borate, tetraphenylporphyrin manganese tetraphenyl borate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis (pentafluorophenyl)borate, trityl tetrakis (pentafluorophenyl)borate, lithium tetrakis (pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

The compounds of component (b-2) may be used singly or in combination of two or more.

The relative amounts of component (A) and component (B) used in the present invention are as follows: when component (b-1) is used as component (B), the ratio of the amounts by mole of component (A) to component (B) is preferably 1:1 to 1:1,000,000 and more preferably 1:10 to 10,000 and, when component (b-2) is used as component (B), the ratio of the amounts by mole of component (A) to component (B) is preferably 10:1 to 1:100 and more preferably 2:1 to 1:10. As component (B), any of component (b-1) and component (b-2) may be used singly or in combination of two or more.

The catalyst for producing a polymer of an α-olefin used in the present invention may comprise component (A) and component (B) described above as the main components or component (A), component (B) and (C) an organoaluminum compound as the main components. As the organoaluminum compound of component (C), a compound represented by general formula (VII) is used.

$$R^{62}{}_{v}AlQ_{3-v} \quad (VII)$$

In general formula (VII), $R^{62}$ represents an alkyl group having 1 to 10 carbon atoms, Q represents hydrogen atom, an alkoxy group having 1 to 20 carbon atoms, an aryl group having 6 to 20 carbon atoms or a halogen atom and v represents an integer of 1 to 3.

Examples of the compound represented by general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride. The organoaluminum compound may be used singly or in combination of two or more. Component (C) is used in such an amount that the ratio of the amounts by mole of component (A) to component (C) is preferably 1:1 to 1:10,000 and more preferably 1:5 to 1:2,000 and most preferably 1:10 to 1:1,000. By using component (C), the polymerization activity based on the amount of the transition metal can be increased. However, when the amount of component (C) exceeds the above range, a portion of the organoaluminum compound is not utilized and residues of the organoaluminum compound remains in the polymer in a great amount. Therefore, such an amount is not preferable.

In the present invention, at least one of the components of the catalyst may be supported on a suitable support. The type of the support is not particularly limited. A support of an inorganic oxide, an inorganic support other than oxides or an organic support may be used. From the standpoint of controlling morphology, a support of an inorganic oxide or an inorganic support other than oxides is preferable.

Examples of the support of an inorganic oxide include $SiO_2$, $Al_2O_3$, MgO, $ZrO_2$, $TiO_2$, $Fe_2O_3$, $B_2O_3$, CaO, ZnO, BaO, $ThO_2$ and mixtures of these compounds and, more specifically, silica-alumina, zeolite, ferrite and glass fiber. Among these substances, $SiO_2$ and $Al_2O_3$ are preferable.

The above inorganic support may contain small amounts of carbonates, nitrates and sulfates. Examples of the inorganic support other than oxides include magnesium compounds represented by $MgR^{63}{}_xX^5{}_y$ such as $MgCl_2$ and $Mg(OC_2H_5)_2$ and complexes of the magnesium compounds. In the formula, $R^{63}$ represents an alkyl group having 1 to 20 carbon atoms, an alkoxy group having 1 to 20 carbon atoms or an aryl group having 6 to 20 carbon atoms, $X^5$ represents a halogen atom or an alkyl group having 1 to 20 carbon atoms, x represents a number of 0 to 2, y represents a number of 0 to 2 and x+y=2. A plurality of groups represented by $R^{63}$ may be the same with or different from each other and a plurality of groups and atoms represented by $X^5$ may be the same with or different from each other.

Examples of the organic support include polymers such as polystyrene, copolymers of styrene and divinylbenzene, polyethylene, polypropylene, substituted polystyrenes and polyarylates, starch and carbon black. As the support used in the present invention, $MgCl_2$, $MgCl(OC_2H_5)$, $Mg(OC_2H_5)_2$, $SiO_2$ and $Al_2O_3$ are preferable. The properties of the support are different depending on the type and the process of preparation. The average particle diameter is, in general, 1 to 300 μm, preferably 10 to 200 μm and more preferably 20 to 100 μm. When the average particle diameter is smaller than the above range, the amount of fine powder in the polymer increases. When the average particle diameter exceeds the above range, the amount of rough particles in the polymer increases and a decrease in the bulk density and clogging of a hopper may take place. The specific surface area of the support is, in general, 1 to 1,000 m²/g and preferably 50 to 500 m²/g. The volume of pores is, in general, 0.1 to 5 cm³/g and preferably 0.3 to 3 cm³/g. When any of the specific surface area and the volume of pores is outside the above ranges, the catalyst activity occasionally decreases. The specific surface area and the volume of pores can be obtained, for example, from the volume of adsorbed nitrogen gas in accordance with the BET method (J. Am. Chem. Soc., 60, 309 (1983)). It is preferable that the above support is used after being calcined, in general, at 150 to 1,000° C. and preferably at 200 to 800° C.

When the catalyst component is supported on the support described above, it is preferable that at least one of components (A) and (B) is supported and it is more preferable that components (A) and (B) are both supported. The process for supporting at least one of components (A) and (B) is not particularly limited. Examples of the process include (i) a process in which at least one of components (A) and (B) is mixed with a support; (ii) a process in which a support is treated with an organoaluminum compound or a silicon compound having a halogen and then at least one of components (A) and (B) is mixed with the treated support in an inert solvent; (iii) a process in which a support, at least one of components (A) and (B) and an organoaluminum compound or a silicon compound having a halogen are reacted; (iv) a process in which component (A) or component (B) is supported on a support and then mixed with component (B) or component (A), respectively; (v) a process in which a product of a catalytic reaction of components (A) and (B) is mixed with a support; and (vi) a process in which a catalytic reaction of components (A) and (B) is conducted in the presence of a support. In the reactions described above, an organoaluminum compound of component (C) may be added.

The catalyst obtained as described above may be used for the polymerization without further treatments or may be taken out as a solid product after the solvent is removed and used for the polymerization. In the present invention, the operation for supporting at least one of components (A) and (B) on a support may be conducted in the polymerization system so that the polymerization catalyst is formed. For example, at least one of components (A) and (B), a support and an organoaluminum compound of component (C), where necessary, are placed into the polymerization system and particles of the catalyst are formed by a preliminary polymerization conducted by passing an olefin such as ethylene at an ordinary pressure to 2 MPa at 20 to 200° C. for 1 minute to 2 hours.

In the present invention, it is preferable that component (A) and the support described above are used in amounts such that the ratio of the amounts by weight is 1:0.5 to 1:1,000 and more preferably 1:1 to 1:50. It is preferable that component (B) and the support are used in amounts such that the ratio of the amounts by weight is 1:5 to 1:10,000 and more preferably 1:10 to 1:500. When a mixture of two or more types of components are used as component (B), it is preferable that the relative amounts by mass of each component of component (B) and the support is in the above range. It is preferable that component (A) and the support described above are used in amounts such that the ratio of the amounts by weight is 1:5 to 1:10,000 and more preferably 1:10 to 1:500. When the relative amounts of component (B) (either component (A) or component (B)) and the support or the relative amounts of component (A) and the support are outside the above range, the activity occasionally decreases. The polymerization catalyst of the present invention prepared as described above has an average particle diameter, in general, in the range of 2 to 200 μm, preferably in the range of 10 to 150 μm and more preferably in the range of 20 to 100 μm; a specific surface area, in general, in the range of 20 to 1,000 m$^2$/g and preferably in the range of 50 to 500 m$^2$/g. When the average particle diameter is smaller than 2 μm, the amount of fine particles in the polymer occasionally increases. When the average particle diameter exceeds 200 μm, the amount of rough particles in the polymer occasionally increases. When the specific surface area is smaller than 20 m$^2$/g, the activity occasionally decreases. When the specific surface area exceeds 1,000 m$^2$/g, the bulk density of the polymer occasionally decreases. In the present invention, it is preferable that the amount of the transition metal per 100 g of the support is, in general, in the range of 0.05 to 10 g and preferably in the range of 0.1 to 2 g. When the amount of the transition metal is outside the above range, the activity occasionally decreases. An industrially advantageous process can be obtained by supporting the catalyst as described above.

As the α-olefin having 4 or more carbon atoms used in the present invention, an α-olefin having 4 to 20 carbon atoms is preferable. Examples of the α-olefin include 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicocene. The α-olefin may be used singly or in combination of two or more. Among the above α-olefins, α-olefins having 4 to 14 carbon atoms are preferable and α-olefins having 6 to 10 carbon atoms which are easily available and have low prices are more preferable.

In the present invention, the process for polymerization is not particularly limited. Any of the slurry polymerization, the gas phase polymerization, the bulk polymerization, the solution polymerization and the suspension polymerization may be used. As for the conditions of polymerization, the temperature of polymerization is, in general, in the range of −100 to 250° C., preferably in the range of −50 to 200° C. and more preferably in the range of 0 to 160° C. As for the amount of the catalyst relative to the amount of the raw material of the reaction, it is preferable that the ratio of the amounts by mole of the monomer of the raw material to component (A) is in the range of 1 to $10^8$ and more preferably in the range of 100 to $10^5$. The time of polymerization is, in general, in the range of 5 minutes to 10 hours. The pressure of polymerization is preferably in the range of an ordinary pressure to 20 MPa and more preferably in the range of an ordinary pressure to 10 MPa.

In the process of the present invention, it is preferable that hydrogen is added in the polymerization of an α-olefin having 4 or more carbon atoms since the polymerization activity is enhanced. When hydrogen is added, the pressure of hydrogen is, in general, in the range of an ordinary pressure to 5 MPa, preferably in the range of an ordinary pressure to 3 MPa and more preferably in the range of an ordinary pressure to 2 MPa. When a solvent is used for the polymerization, an aromatic hydrocarbon such as benzene, toluene, xylene and ethylbenzene, an alicyclic hydrocarbon such as cyclopentane, cyclohexane and methylcyclohexane, an aliphatic hydrocarbon such as pentane, hexane, heptane and octane or a halogenated hydrocarbon such as chloroform and dichloromethane can be used as the solvent. The solvent may be used singly or in combination of two or more. A monomer such as 1-butene may be used as the solvent. The polymerization may be conducted without using any solvents depending on the process of the polymerization.

In the present invention, a preliminary polymerization may be conducted using the above polymerization catalyst. The preliminary polymerization can be conducted, for example, by bringing a small amount of an olefin into contact with a solid component of the catalyst. The process of the preliminary polymerization is not particularly limited and a conventional process can be used. The olefin used for the preliminary polymerization is not particularly limited. For example, ethylene, an α-olefin having 3 to 20 carbon atoms or a mixture of these olefins may be used. It is advantageous that the same olefin as the monomer used for the polymerization is used. The temperature of the preliminary polymerization is, in general, in the range of −20 to 200° C., preferably in the range of −10 to 130° C. and more preferably in the range of 0 to 80° C. In the preliminary polymerization, inert hydrocarbons, aliphatic hydrocarbons, aromatic hydrocarbons and monomers may be used as the solvent. Among these solvents, aliphatic hydrocarbons are preferable. The preliminary polymerization may be conducted without any solvents. In the preliminary polymerization, it is preferable that the condition of the polymerization is adjusted so that the product of the preliminary polymerization has an intrinsic viscosity [η] (as measured in decaline at 135° C.) of 0.1 dl/g or greater and the amount of the product of the preliminary polymerization is in the range of 1 to 10,000 g and more preferably in the range of 10 to 1,000 g per 1 mmole of the transition metal component of the catalyst. The copolymer of an α-olefin of the present invention can be obtained efficiently in accordance with the process described above.

The molecular weight of the polymer can be adjusted by suitably selecting the type and the amount of the catalyst components and the temperature of polymerization. The molecular weight can also be adjusted by conducting the polymerization in the presence of hydrogen. An inert gas such as nitrogen gas may be present during the polymerization.

2. The Polymer of an α-olefin

The polymer of an α-olefin is obtained in accordance with the process for producing a polymer of an α-olefin described above.

It is preferable that the polymer of an α-olefin of the present invention has a weight-average molecular weight in the range of 300 to 1,000,000 as measured in accordance with the gel permeation chromatography. When the weight-average molecular weight is smaller than 300, the molecular weight is so low that the effect as a component of lubricant is occasionally not obtained. When the molecular weight exceeds 1,000,000, the molecular weight is so high that the effect as a component of lubricant is occasionally not obtained. From the standpoint of the above effect, it is more preferable that the molecular weight is in the range of 300 to 500,000. The method of obtaining the molecular weight in accordance with the gel permeation chromatography will be described in detail in EXAMPLES.

It is preferable that the polymer of an α-olefin of the present invention has an intrinsic viscosity [η] in the range of 0.01 to 20 dl/g as measured in decaline at 135° C. When [η] is smaller than 0.01 dl/g, the intrinsic viscosity is so low that the effect as a component of lubricant is occasionally not obtained. When [η] exceeds 20 dl/g, the intrinsic viscosity is so high that the effect as a component of lubricant is occasionally not obtained. From the standpoint of the above effect, it is more preferable that the intrinsic viscosity is in the range of 0.1 to 10 dl/g and most preferably in the range of 0.1 to 5 dl/g.

It is preferable that the polymer of an α-olefin of the present invention has a ratio (Mw/Mn) of the weight-average molecular weight (Mw) to the number average molecular weight (Mn), as measured in accordance with the gel permeation chromatography, satisfying the following relation:

$$1<Mw/Mn \leq 4$$

more preferably, the following relation:

$$1<Mw/Mn \leq 3.5$$

and most preferably, the following relation:

$$1<Mw/Mn \leq 3$$

The polymer of an α-olefin of the present invention may be hydrogenated. When the polymer of an α-olefin is used as lubricant, a hydrogenated polymer of an α-olefin obtained from the above polymer of an α-olefin is preferable. The process for hydrogenation is not particularly limited and a process suitably selected from conventional processes can be used.

3. The Lubricant

The lubricant of the present invention comprises at least one of the polymer of an α-olefin and the hydrogenated polymer of an α-olefin obtained from the polymer of an α-olefin. The lubricant of the present invention comprises at least one of the polymer of an α-olefin and the hydrogenated polymer of an α-olefin obtained from the polymer of an α-olefin in an amount of 0.01 to 100% by weight. The form of application of the lubricant of the present invention is not particularly limited. At least one of the polymer of an α-olefin and the hydrogenated polymer of an α-olefin obtained from the polymer of an α-olefin may be used as the base oil. As the base oil, polymers having a wide range of molecular weight can be used. When a polymer having a relatively low molecular weight (a weight-average molecular weight in the range of 300 to 3,000) is used as the base oil, the polymer may be used singly or as a mixture with other base oils. The content of the polymer in the base oil is not particularly limited. In general, the content is in the range of 1 to 100% by weight.

As an example of other forms of application of the lubricant, at least one of the polymer of an α-olefin and the hydrogenated polymer of an α-olefin obtained from the polymer of an α-olefin is used as an additive to lubricant. For example, the polymer is added to lubricant as the viscosity index improver. In this case, it is preferable that a polymer of an α-olefin having a relatively high molecular weight is used. For example, as the polymer of α-olefin having a high molecular weight, a polymer having a weight-average molecular weight which exceeds 3,000 and is 200,000 or smaller is used. The amount of the polymer added to the lubricant is, in general, in the range of 0.01 to 50% by weight.

The lubricant of the present invention may further comprise various suitable conventional additives as long as the object of the present invention is not adversely affected. Examples of the additive include extreme pressure agents containing phosphorus such as phosphoric acid esters and phosphorous acid esters; oiliness improvers such as carboxylic acids such as oleic acid, stearic acid and dimer acid and esters of carboxylic acids; antiwear agents such as zinc dithiophosphate (ZnDTP, excluding allyl-type compounds), zinc dithiocarbamate (ZnDTC), molybdenum oxysulfide dithiocarbamate (MoDTC), nickel dithiophosphate (NiDTP) and nickel dithiocarbamate (NiDTC); antioxidants such as amine antioxidants and phenol antioxidants; metal inactivators such as thiadiazole and benzotriazole; sludge dispersants such as alkenylsuccinic acids and esters and imides of alkenylsuccinic acids; rust preventives such as sorbitan esters and sulfonates, phenates and salicylates of neutral alkaline earth metals; and defoaming agents such as dimethylpolysiloxane and polyacrylates.

The type of the lubricant of the present invention is not particularly limited. Examples of the lubricant include gasoline engine oil (for 2-cycle and 4 cycle engines), oil for internal combustion engines such as Diesel engine oil, gear oil, ATF, PSF, oil for driving systems and chassis such as shock absorber oil, turbine oil, hydraulic oil, transmission oil, machine oil, oil for apparatuses such as refrigerating oil, oil for machine working such as rolling oil, cutting oil and heat treatment oil, and grease.

To summarize the advantages of the present invention, the polymer of an α-olefin which is useful as a component of lubricant is efficiently obtained.

EXAMPLES

The present invention will be described more specifically with reference to examples in the following. However, the present invention is not limited to the examples. Physical properties of a polymer of an α-olefin and a hydrogenated polymer obtained from a polymer of an α-olefin were evaluated in accordance with the following methods.

(1) Mw/Mn

Mw/Mn was measured using an apparatus manufactured by NIPPON BUNKO Co., Ltd., GPC-880 (the column: TSKGMH-6×1 manufactured by TOSO Co., Ltd. and GL-A120×1 and GL-A130×1 manufactured by HITACHI SEISAKUSHO Co., Ltd.) in chloroform as the solvent at a temperature of 23° C. and expressed as Mw/Mn of the corresponding polystyrene.

(2) Pour Point

The pour point was measured in accordance with the method of Japanese Industrial Standard K 2269.

(3) Kinematic Viscosity and Viscosity Index

The kinematic viscosity was measured in accordance with the method of Japanese Industrial Standard K 2283. The viscosity index was calculated from the kinematic viscosity in accordance with the method of Japanese Industrial Standard K 2283.

Example 1

(1) Synthesis of (1,1'-dimethylsilylene)(2,2'-isopropylidene) bis(indenyl)zirconium dichloride (i) Into a three-necked flask which was purged with nitrogen, 10.8 g (444 mmoles) of Mg and 45 ml of tetrahydrofuran (THF) were placed and then 0.6 ml of 1,2-dibromomethane was added. After the resultant mixture was stirred for 5 minutes, the solvent was removed and then 200 ml of THF was added. A solution prepared by dissolving 18.3 g (105 mmoles) of α,α-dichloro-o-xylene in 300 ml of THF was added dropwise to the obtained mixture at the room temperature over 3 hours. The reaction mixture was further stirred at the room temperature for 15 hours.

The reaction mixture was cooled to −78° C. and 100 ml of a THF solution containing 6.6 g (36.2 mmoles) of diethyl dimethylmalonate was added dropwise to the reaction mixture over 1 hour. After the resultant mixture was further stirred at the room temperature for 2 hours, 100 ml of water was added. The obtained reaction mixture was filtered under suction. After the solvent in the filtrate was removed by distillation in vacuo, a 1 N aqueous solution of ammonium chloride was added and the resultant mixture was subjected to extraction with dichloromethane. The organic phase was washed with 100 ml of water twice and dried with magnesium sulfate. After the solvent was removed by distillation, a yellow oily substance was obtained. The obtained substance was purified in accordance with the column chromatography and recrystallized from hexane and 4.8 g (the yield: 44%) of colorless crystals of compound (1) were obtained.

The result of the measurement of $^1$H-NMR was as follows:

$^1$H-NMR (CDCl$_3$) δ: 1.235 (s, 6H, CH$_3$), 3.002 (d, J=16.4 Hz), 3.470 (d, J=16.4 Hz), (8H, CH$_2$), 3.767 (s, 2H, OH) and 7.2 to 7.4 (m, 8H, PhH)

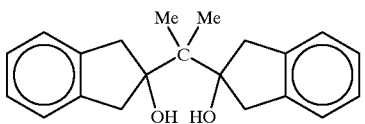

(Me represents methyl group; the same in the formulae shown hereinafter.)

(ii) Compound (1) in an amount of 4.8 g (15.9 mmoles) was dissolved in 30 ml of dichloromethane. To the resultant solution, 3.04 g (15.9 mmoles) of p-toluenesulfonic acid was added and the mixture was heated under refluxing for 8 hours. The reaction mixture was washed with an aqueous solution of sodium hydrogencarbonate and water, successively, and dried with anhydrous magnesium sulfate. After the solvent was removed by distillation, a yellow oily substance was obtained. The obtained substance was purified in accordance with the column chromatography and recrystallized from hexane and 2.3 g (the yield: 54%) of compound (2) was obtained.

The result of the measurement of $^1$H-NMR was as follows:

$^1$H-NMR (CDCl$_3$) δ: 1.586 (s, 6H, CH$_3$), 3.470 (s, 4H, CH$_2$), 3.767 (s, 2H, CpH) and 6.9 to 7.5 (m, 8H, PhH)

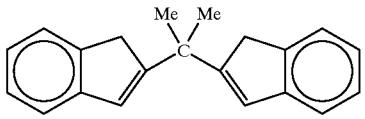

(iii) Into a Schlenk tube purged with nitrogen, 6.2 g (22.7 mmoles) of compound (2) and 50 ml of diethyl ether were placed.

The above solution was cooled at −78° C. and 28.4 ml (45.4 mmoles) of a solution of butyllithium (1.60 moles/liter) was added dropwise. After the resultant mixture was stirred at the room temperature for 3 hours, the supernatant liquid was removed and the precipitates were washed twice with 20 ml of diethyl ether. After being dried in vacuo, white powder of dilithium salt (3) was obtained.

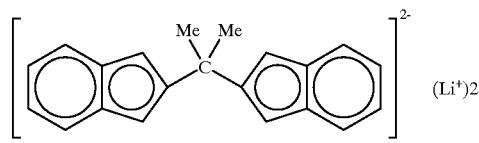

(iv) Dilithium salt (3) obtained above was dissolved in 100 ml of THF and 3.0 g (22.7 mmoles) of dichlorodimethylsilane was added dropwise at the room temperature. After the resultant mixture was stirred at the room temperature for 3 hours, the solvent was removed by distillation and then 100 ml of water was added. The aqueous phase was subjected to extraction with 200 ml of dichloromethane and the organic phase was washed twice with water and dried with anhydrous magnesium sulfate. After the solvent was removed by distillation and the obtained solid substance was recrystallized from hexane, 6.5 g (the yield: 86.5%) of colorless crystals of compound (4) were obtained.

The result of the measurement of $^1$H-NMR was as follows:

$^1$H-NMR (CDCl$_3$) δ: −0.354 (s, 6H, SiCH$_3$), 1.608 (s, 6H, CCH$_3$), 3.347 (s, 2H, SiCH), 6.785 (s, 2H, CpH) and 6.9 to 7.6 (m, 8H, PhH)

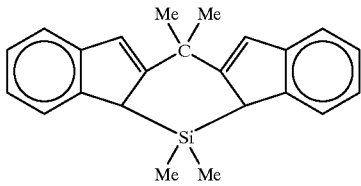

(v) Into a Schlenk tube purged with nitrogen, 0.9 g (2.7 mmoles) of compound (4) and 50 ml of hexane were placed. The above solution was cooled at 0° C. and 3.4 ml (5.4 mmoles) of a solution of butyllithium (1.60 moles/liter) was added dropwise. After the resultant mixture was stirred at the room temperature for 3 hours, the supernatant liquid was removed and the precipitates were washed twice with 50 ml of hexane. After the remaining solid substance was dried in vacuo, pink powder of dilithium salt (5) was obtained.

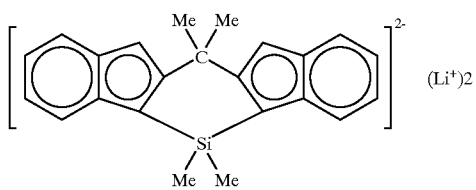

(vi) To dilithium salt (5) obtained above, 50 ml of toluene was added. To the obtained suspension, 20 ml of a suspension containing 0.63 g (2.7 mmoles) of zirconium tetrachloride was added dropwise at 0° C. After the resultant mixture was stirred at the room temperature for 24 hours, the precipitates were removed by filtration and the filtrate was concentrated. After recrystallization from a mixture of toluene and hexane, 0.24 g (the yield: 19%) of yellowish orange crystals of compound (6) were obtained.

The result of the measurement of $^1$H-NMR was as follows:

$^1$H-NMR (CDCl3) δ: −0.172 (s, 3H, SiCH$_3$), 0.749 (s, 3H, SiCH$_3$), 1.346 (s, 3H, CCH$_3$), 2.141 (s, 3H, CCH$_3$), 6.692 (s, 2H, CpH) and 6.9 to 8.1 (m, 8H, PhH)

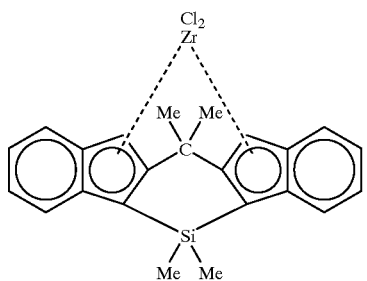

(2) Polymerization of 1-octene

Into an autoclave made of stainless steel and having an inner volume of 1 liter, which was dried sufficiently and purged with nitrogen, 200 ml of 1-octene and 5 mmoles of methylaluminoxane (as 2.5 ml of a heptane solution having a concentration of 2.0 mmoles/ml) were placed. Then, hydrogen was introduced so that the pressure was adjusted at 0.2 MPaG and the temperature was raised to 65° C. Into the reactor, 5 micromoles of (1,1'-dimethylsilylene) (2,2'-isopropylidene)bis(indenyl)zirconium dichloride (as 1 ml of a heptane solution having a concentration of 5 micromoles/ml) was added and the polymerization was started. After 30 minutes, 10 ml of methanol was added and the polymerization was terminated. The content was taken out and solid substances were removed by filtration through a filter paper 2C manufactured by TOYO ROSHI Co., Ltd. From the obtained solution, heptane, the raw materials of the reaction and methanol were removed using a rotary evaporator (under a vacuum of about 1.0×10$^{-4}$ MPa in an oil bath at 100° C.) and 40 g of a colorless transparent liquid was obtained. The results of evaluation obtained in accordance with the methods described above are shown in Table 1.

Example 2

The same procedures as those conducted in Example 1 were conducted except that the pressure of hydrogen was adjusted at 0.7 MPaG and 62 g of a colorless transparent liquid was obtained. The results of evaluation obtained in accordance with the methods described above are shown in Table 1.

Example 3

The same procedures as those conducted in Example 1 were conducted except that 1-dodecene was used in place of 1-octene, 10 mmoles of methylaluminoxane (as 5.0 ml of a hexane solution having a concentration of 2.0 mmoles/ml) was used and 10 micromoles of (1,1'-dimethylsilylene) (2,2'-isopropylidene)bis(indenyl)zirconium dichloride (as 2 ml of a heptane solution having a concentration of 5 micromoles/ml) was used and 80 g of a colorless transparent liquid was obtained. The results of evaluation obtained in accordance with the methods described above are shown in Table 1.

Example 4

Hydrogenation of a Polymer of an α-olefin (1) Preparation of a Catalyst

Into a 2 liter autoclave made of SUS 316 stainless steel, 100 g of nickel diatomaceous earth (manufactured by NIKKI KAGAKU Co., Ltd.; N-113) and 300 ml of 2,2,4-trimethylpentane were placed. After the autoclave was purged with hydrogen, the pressure of hydrogen was raised to 2.0 MPaG and the temperature was raised to 140° C. The autoclave was kept in this condition for 1 hour and then cooled to the room temperature and a catalyst was prepared.

(2) Hydrogenation

The autoclave containing the catalyst prepared above was opened after being purged with nitrogen and 50 g of the polymer of 1-octene obtained in Example 2 was placed into the autoclave. After the autoclave was purged with hydrogen, the pressure of hydrogen was raised to 2.0 MPaG and the temperature was raised to 120° C. The autoclave was kept in this condition for 2 hour and then cooled to the room temperature. The autoclave was opened after being purged with nitrogen and the reaction mixture was taken out. The catalyst was removed from the reaction mixture by filtration. From the obtained solution, 2,2,4-trimethylpentane was removed using a rotary evaporator (under a vacuum of about 1.0×10$^{-4}$ MPa in an oil bath at 100° C.) and 47 g of a colorless transparent liquid was obtained. The results of evaluation obtained in accordance with the methods described above are shown in Table 1.

TABLE 1

| | Example 1 | Example 2 | Example 3 | Example 4 |
|---|---|---|---|---|
| Number-average molecular weight (Mn) | 2550 | 2080 | 3470 | — |
| Weight-average molecular weight (Mw) | 6830 | 3430 | 5920 | — |
| Mw/Mn | 2.68 | 1.65 | 1.71 | — |
| Kinematic Viscosity (mm$^2$/s at 40° C.) | 1620 | 382.3 | 419.0 | 389.0 |
| Kinematic Viscosity (mm$^2$/s at 100° C.) | 139.0 | 42.95 | 53.61 | 43.06 |
| Viscosity index | 192 | 168 | 195 | 166 |
| Pour point (° C.) | −37.5 | −50.0 | −25.0 | −50.0 |

What is claimed is:

1. A process for producing a polymer comprising one or more α-olefins, said process comprising polymerizing one or more α-olefins having at least 4 carbon atoms in the presence of a catalyst, said catalyst comprising:

(A) at least one compound represented by formula (II):

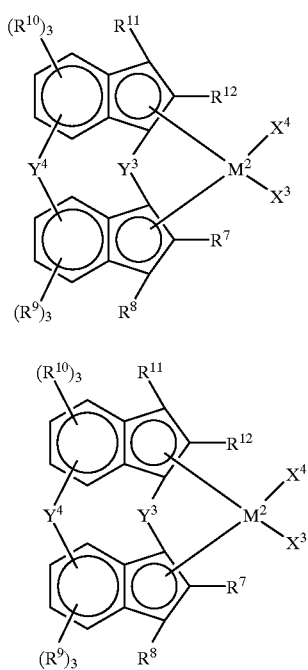

(II)

(II)

wherein
  $R^7$ to $R^{12}$ and $X^3$ to $X^4$ each independently represent a hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^7$ to $R^{12}$ and $X^3$ to $X^4$ may form a ring by forming bonds between each other; three groups represented by $R^9$ may be the same or different from each other; three groups represented by $R^{10}$ may be the same or different from each other;
  $Y^3$ to $Y^4$ each independently represent a divalent group which forms a bond between two ligands and is selected from hydrocarbon groups having 1 to 20 carbon atoms, hydrocarbon groups having 1 to 20 carbon atoms and a halogen atom, a group having silicon, a group having germanium, a group having tin, —O—, —CO—, —S—, —SO$_2$—, —NR$^{13}$—, —PR$^{13}$—, —P(O)R$^{13}$—, —BR$^{13}$— and —AlR$^{13}$—, $R^{13}$ representing a hydrogen atom, a halogen atom, a hydrocarbon group having 1 to 20 carbon atoms or a hydrocarbon group having 1 to 20 carbon atoms and a halogen atom, and $M^2$ represents a transition metal of Groups 4 to 6 of the Periodic Table; and (B) at least one compound selected from (b-1) organoaluminum oxy compounds and (b-2) ionic compounds which can be converted into cations by reaction with the transition metal compounds of component (A).

2. The process according to claim 1, which comprises polymerizing one or more α-olefins having at least 4 carbon atoms in the presence of hydrogen.

3. A polymer of an α-olefin which is obtained by hydrogenating a polymer obtained by the process as claimed in claim 1, wherein said polymer has a weight-average molecular weight of from 300 to 1,000,000.

4. The process as claimed in claim 1, wherein the α-olefin is selected from the group consisting of 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, and mixtures thereof.

5. The process as claimed in claim 1, wherein the transition metal compound is of formula (II)A

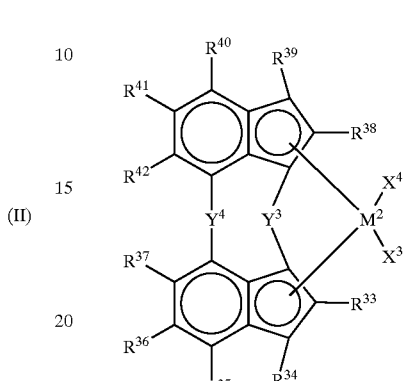

(II)A wherein $R^{33}$ to $R^{42}$ and $X^3$ to $X^4$ each independently represent a hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^{33}$ to $R^{42}$, $X^3$ and $X^4$ may form a ring by forming bonds between each other;
  $Y^3$ to $Y^4$ each independently represent a divalent group which forms a bond between two ligands and is selected from hydrocarbon groups having 1 to 20 carbon atoms, hydrocarbon groups having 1 to 20 carbon atoms and a halogen atom, a group having silicon, a group having germanium, a group having tin, —O—, —CO—, —S—, —SO$_2$—, —NR$^{55}$—, —PR$^{55}$—, —P(O)R$^{55}$—, —BR$^{55}$ — and —AlR$^{55}$ , $R^{55}$ representing a hydrogen atom, a halogen atom, a hydrocarbon group having 1 to 20 carbon atoms or a hydrocarbon group having 1 to 20 carbon atoms and a halogen atom, and $M^2$ represents a transition metal of Groups 4 to 6 of the Periodic Table.

6. The process as claimed in claim 1, wherein the transition metal compound is of formula (II)B,

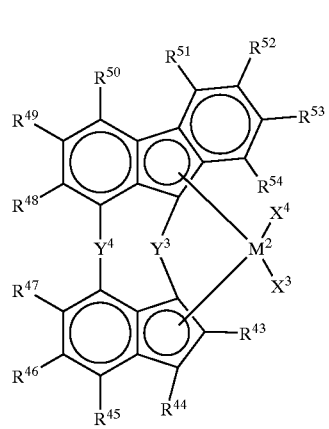

(II)B wherein $R^{43}$ to $R^{54}$ and $X^3$ to $X^4$ each independently represent a hydrogen atom, a halogen atom, a hydrocarbon group having 1 to 20 carbon atoms, a hydrocarbon group having 1 to 20 carbon atoms and a halogen atom, a group having silicon, a group having oxygen, a group having sulfur, a group having nitrogen or a group having phosphorus; adjacent groups among groups represented by $R^{43}$ to $R^{54}$, $X^3$ and $X^4$ may form a ring by forming bonds between each other;

$Y^3$ to $Y^4$ each independently represent a divalent group which forms a bond between two ligands and is selected from hydrocarbon groups having 1 to 20 carbon atoms, hydrocarbon groups having 1 to 20 carbon atoms and a halogen atom, a group having silicon, a group having germanium, a group having tin, —O—, —CO—, —S—, —SO$_2$—, —NR$^{55}$—, —PR$^{55}$—, —P(O)R$^{55}$—, —BR$^{55}$— and —AlR$^{55}$—, $R^{55}$ representing a hydrogen atom, a halogen atom, a hydrocarbon group having 1 to 20 carbon atoms or a hydrocarbon group having 1 to 20 carbon atoms and a halogen atom, and $M^2$ represents a transition metal of Groups 4 to 6 of the Periodic Table.

7. The process as claimed in claim 2, wherein hydrogen is present at a pressure of up to 5 MPa.

8. The process as claimed in claim 1, further comprising hydrogenating the polymer of one or more α-olefins.

9. The polymer as claimed in claim 3, wherein said polymer has a pour point of between −50° C. and −25° C.

* * * * *